United States Patent Office 3,048,474
Patented Aug. 7, 1962

3,048,474
CATALYTIC RECOMBINATION OF RADIOLYTIC GASES IN THORIUM OXIDE SLURRIES
Leon E. Morse, Oak Ridge, Tenn., assignor to the United States of America as represented by the United States Atomic Energy Commission
No Drawing. Continuation of application Ser. No. 701,938, Dec. 10, 1957. This application Dec. 7, 1961, Ser. No. 158,160
6 Claims. (Cl. 23—204)

My invention relates to a method of combining hydrogen and oxygen into water and more particularly to combining these elements into water in an aqueous thorium oxide slurry. This application is a continuation of my co-pending application, Serial No. 701,938, filed December 10, 1957, now abandoned.

Water, upon being subjected to significant amounts of nuclear radiation, is decomposed to produce a mixture of gaseous products comprised chiefly of a substantially stoichiometric mixture of hydrogen and oxygen. This radiolytic decomposition presents a serious problem in the operation of aqueous homogeneous nuclear reactors of the type described in co-pending application Serial No. 321,078, entitled "Improved Neutronic Reactor Operational Method and Core System," filed November 18, 1952, now U.S. Patent 2,945,794, by C. E. Winters et al. The method of operation of this type reactor is also described in "Aqueous Homogeneous Power Reactors," by R. B. Briggs and J. H. Swartout, published in volume III, Session 12A, Proceedings of the International Conference on the Peaceful Uses of Atomic Energy, United Nations, 1956. In one embodiment of this type reactor, an aqueous uranyl sulfate fuel solution is circulated through a central core and an aqueous thorium oxide slurry is circulated through a blanket surrounding the core. By means of this arrangement breeding is carried out, that is, fissionable $U^{233}$ is produced in the blanket slurry by irradiation of fertile $Th^{232}$. During the operation of this type reactor the water, which may be either light or heavy, is subjected to strong irradiation by gamma and beta rays, fission fragments and neutrons, resulting in decomposition of the water into hydrogen, which may be ordinary hydrogen or deuterium, and oxygen. The bubbling of these gases, even in small amounts, may create a serious reactor control problem and result in erratic operation. In addition these gases upon accumulation present an explosion hazard. For these reasons and in order to maintain the liquid level of the system, particularly in the case of costly deuterium, these gases must be recombined into water.

Recombination of these gases may be accomplished external to that portion of the system where the decomposition primarily takes place or may be accomplished, at least in part, internally if some component of the fuel or blanket catalyzes the recombination at a sufficiently rapid rate.

Internal recombination of at least a portion of these gases is advantageous by virtue of its minimizing the engineering problems associated with external recombiners. Internal recombination, however, involves the problem of securing a catalyst having sufficient activity to recombine the gases as rapidly as they are formed. In the case of a blanket slurry containing approximately 500 to 1000 grams of thorium per liter as thorium oxide and 3 to 5 grams of uranium per liter as $UO_3$, these being the concentrations expected to be employed, it is estimated that for satisfactory performance the catalyst should have an activity such that a reaction rate equivalent to the consumption of approximately 10 moles of hydrogen per liter per hour is attained at a temperature of 280° C. and a hydrogen partial pressure of 500 p.s.i. Recombination is catalyzed to a limited extent by the slurry itself. For example, in a thorium oxide slurry containing 530 g. of thorium per kilogram of water and at a temperature of 300° C., hydrogen partial pressure of 500 p.s.i. and in the presence of excess oxygen, hydrogen and oxygen are combined at rates from 0.01 to 0.045 mole of $H_2$ per liter per hour by the thorium oxide alone and at rates from 0.08 to 0.01 mole $H_2/l./hour$ when 4 to 8% uranium trioxide is added to the slurry. These rates are, of course, impractically low.

In addition to a satisfactory reaction rate, the catalyst must be compatible with other components of the system, must have a low thermal neutron capture cross section, and must be economically practical. These requirements have been met for a uranyl sulfate fuel solution by the use of copper ions as the catalyst, as described in co-pending application Serial No. 339,489, entitled "Combination of Hydrogen and Oxygen," filed February 27, 1953, now U.S. Patent 2,863,729, by Harold F. McDuffie and Charles H. Secoy. Copper ions, however, are not a satisfactory catalyst in a thorium oxide slurry because of the absorption of these ions by the thorium oxide particles. Copper ions function as a solution catalyst, and their effectiveness is reduced with the decreased ionic concentration resulting from adsorption.

An object of my invention, therefore, is to provide a suitable catalyst for combining hydrogen and oxygen in aqueous slurry systems.

Another object is to provide a catalyst for recombining hydrogen and oxygen produced by radiolytic decomposition in aqueous slurry systems.

Another object is to provide a catalyst for internally recombining hydrogen and oxygen produced by radiolytic decomposition in a $ThO_2$ slurry used as the blanket breeding material in a thermal breeder neutronic reactor.

Another object is to provide a hydrogen and oxygen combination catalyst having a relatively low thermal neutron absorption cross section.

Another object is to provide such a catalyst which is chemically compatible with a thorium-uranium oxide slurry.

Other objects and advantages of my invention will be apparent from the following description.

In accordance with my invention hydrogen and oxygen in an aqueous thorium oxide slurry may be combined by the addition of a small amount of molybdenum trioxide to the slurry. Substantial amounts of the hydrogen and oxygen produced by irradiation of a thorium-uranium oxide slurry in a nuclear reactor may be recombined internally by this means, thus minimizing the problems associated with external recombiners. Molybdenum trioxide is a suitable catalyst for thorium oxide slurries both with regard to thermal neutron absorption and chemical compatibility with the slurry. Although my invention is primarily applicable to the blanket slurry in a two-region homogeneous reactor, it should be apparent to one skilled in the art that a molybdenum trioxide catalyst may also be employed under proper conditions in a one-region reactor employing a thorium oxide slurry.

My invention is applicable generally to the combining of hydrogen and oxygen in pressurized aqueous thorium oxide systems over a wide range of temperatures and concentrations. A rapid reaction rate may be obtained within the 150 to 300° C. temperature range expected to be employed in the blanket slurry of a nuclear reactor, although my invention is not to be understood as so limited. Substantial recombination may also be obtained at temperatures as low as room temperature, and the increased reaction rate at high temperatures indicates that effective combination could be obtained at temperatures above 300° C. A total system pressure of over 200 p.s.i. is required for effective combination, with the reaction rate increasing with increasing pressures. Pressures of 200–3000 p.s.i. are generally satisfactory, and a particularly effective reaction rate may be obtained by maintaining a pressure level of about 2000 p.s.i. as employed in most homogeneous reactors.

The concentration of molybdenum trioxide required for a sufficiently rapid reaction rate varies with the calcination history of the thorium oxide in the slurry. Thorium oxide calcined at a relatively high temperature, that is, above 800° C. is preferred for reactor slurry use because of its desirable physical properties. In general thorium oxide calcined at higher temperatures for relatively short periods of time requires less catalyst than oxide calcined at lower temperatures for relatively long periods of time. For example, a concentration of 0.012 molal is sufficient for a slurry containing thorium oxide calcined at 1600° C. for four hours but 0.025 molal is required for oxide calcined at 900° C. for twenty-four hours. For the conditions expected to be encountered in the thorium oxide blanket slurry of a nuclear breeder reactor, that is, at operating temperatures from 150 to 300° C. and at concentrations of approximately 500 to 1000 grams of thorium and 3 to 5 grams of uranium per liter, a molybdenum trioxide concentration of from 0.01 molal to 0.2 molal is effective, depending on the calcination history of the thorium oxide. While a slight amount of combination may take place at concentrations lower than this range, the reaction rate may be impractically slow. Concentrations higher than this range may also be employed within the scope of my invention, but reactor efficiency would be unduly decreased. For a slurry containing oxide calcined at 900° C., a concentration of 0.05 molal is preferred since a maximum of catalytic activity takes place at this concentration. The optium concentrations for higher temperature-calcined thorium oxides are slightly lower.

An increased combination rate may be obtained by activating the slurry with hydrogen. In this procedure the slurry containing the catalyst is heated under a hydrogen overpressure in the substantial absence of oxygen. Although these conditions are not critical to my invention, satisfactory activation may be obtained by heating the slurry containing the catalyst for 1.5 hours at a temperature of 280° C. and a hydrogen over-pressure of 1000 p.s.i. measured at room temperature. At concentrations of 0.1 molal and below, the combination rate is usually substantially increased by this means, but at higher concentrations the rate is only slightly affected.

Prolonged heating of the slurry under an oxygen overpressure has no detrimental effect on the combination rate. Separate heating of the slurry under an oxygen atmosphere is not essential to the invention, but this measure may be employed to reduce corrosion of the reactor vessels by the slurry.

My invention is further illustrated by the following specific examples.

EXAMPLE I

The combination reaction of hydrogen and oxygen in thorium oxide and thorium-uranium oxide slurries without the presence of any added catalyst was tested in the following manner. Ten ml. of a slurry was added to a 20 ml. stainless steel bomb. Oxygen and hydrogen were added under pressure in stoichiometric ratio at room temperature, and the bomb was heated to 300° C. The decrease in pressure was measured by means of a water-filled capillary connected to the bomb and a pressure cell, which in turn actuated a recorder. The moles of hydrogen, $n$, removed from the system per liter of slurry per unit time, $t$, were calculated from the equation $$\frac{\Delta n}{\Delta t} = k_\pi \times \frac{pV_g}{RT} \times \frac{1000}{V_s}$$

where $V_g$ and $V_s$ are the volumes of gas and slurry, respectively, in cubic centimeters and $k_\pi$ is a reaction rate constant equal to the slope of a plot of the decrease in pressure per time interval versus the average pressure in the interval, perfect gas behavior and first order dependence on hydrogen partial pressure being assumed. For a slurry containing 530 grams of thorium as thorium oxide per liter, rates of 0.04 and 0.045 mole $H_2$/liter/hour were obtained. The rate was increased to 0.1 mole $H_2$/liter/hour for a slurry containing 530 grams of thorium oxide per liter and 4 percent uranium trioxide.

EXAMPLE II

A series of runs was made to test the catalytic activity of molybdenum trioxide at various temperatures and concentrations. These runs were conducted in 15–16 ml. stainless steel bombs provided with an internal thermocouple and a pressure connection through the bomb cap. Pressure and temperature in the bomb were measured and recorded by the thermocouple, a pressure cell and conventional electronic instrumentation. The bomb was heated by an aluminum pipe wound with an insulated Nichrome wire. The heater temperature was measured with a thermocouple positioned between the bomb and heater walls and was closely regulated by commercial controls. The bomb and heater assembly was mounted on the platform of a commercial shaker in order to agitate the slurry.

Each of the runs was conducted in the following manner. The dry solids (thorium oxide, uranium oxide and molybdenum trioxide) were tumbled for one hour. The mixture was then heated and shaken in water at 280° C. for three hours in the presence of an overpressure of oxygen. At each molybdenum trioxide concentration listed in Table I a portion of the slurry was heated to 270–280° C. for 1.5 hours under hydrogen at 1000 p.s.i. measured at room temperature. At each concentration except 0.05 molal a portion of the slurry which had been heated under hydrogen was then heated at 270–280° C. for 2 hours under 500 p.s.i. oxygen, measured at room temperature. In each combination run the bomb was filled to slightly over half its capacity with slurry at room temperature and charged with a mixture of hydrogen and oxygen under pressure with the oxygen being slightly in excess of the stoichiometric amount. The bomb was heated to operating temperature and the total pressure recorded at regular intervals. The moles of hydrogen, $n$, removed from the system per liter of slurry per unit time, $t$, were calculated by the method of Example I. Results of these runs are listed in Table I.

*Table I*

COMBINATION RATES OF HYDROGEN AND OXYGEN IN THORIUM OXIDE SLURRIES AT VARIOUS MOLYBDENUM OXIDE CONCENTRATIONS

[Slurry: 900° C. calcined $ThO_2$, 1,000 g. of Th per kilogram of $H_2O$; 0.5 mole percent $UO_3 \cdot H_2O$; $MoO_3$; heated for 3 hrs. at 280° C. under $O_2$ (250–300 p.s.i. at room temperature)]

| $MoO_3$ concentration (molal) | Conditions | Temperature (° C.) | $k_\pi$(hr.⁻¹) | $H_2$ combination rate $P_{H_2}=500$ p.s.i. (moles/hr./liter) |
|---|---|---|---|---|
| 0.05 | As prepared | 248 | 7 | 3 |
|  | Heated for 1.5 hsr. under $H_2$ at 270–280° C.[1] | 40 | 11 | 12 |
| 0.10 | As prepared | 276 | 3 | 1 |
|  | Heated for 1.5 hrs. under $H_2$ at 270–280° C.[1] | 115 | 21 | 16 |
|  | Reheated reduced slurry for 2 hrs. under $O_2$ at 270–280° C.[2] | 206 | 67 | 31 |
| 0.15 | As prepared | 281 | 21 | 5 |
|  | Heated for 1.5 hrs. under $H_2$ at 270–280° C.[1] | 243 | 25 | 9 |
|  | Reheated reduced slurry for 2 hrs. under $O_2$ at 270–280° C.[2] | 253 | 19 | 6 |
| 0.20 | As prepared | 264 | 27 | 10 |
|  | Heated for 1.5 hrs. under $H_2$ at 270–280° C.[1] | 160 | 16 | 10 |

[1] 1,000 p.s.i. $H_2$ at room temperature.
[2] 500 p.s.i. $O_2$ at room temperature.

EXAMPLE III

A second series of runs was made, using the procedure of Example II. In this series the combination runs were conducted at 150 and 280° C. Details are listed in Table II.

*Table II*

HYDROGEN-OXYGEN COMBINATION RATES IN THORIUM-URANIUM OXIDE SLURRIES

[Slurry: thorium, 1,000 g. per kg. of $H_2O$, $ThO_2$ calcined at 900°C.; uranium, 5 g. per kg. of $H_2O$ added as $UO_3 \cdot H_2O$; $MoO_3$]

| $MoO_3$ concentration (molal) | Slurry as prepared, temperature 280° C. | | Activated slurry,[1] temperature 150° C. | |
|---|---|---|---|---|
| | $k_r(hr^{-1})$ | $H_2$ combination rate $P_{H_2}=500$ p.s.i. (moles/hr./liter) | $k_r(hr^{-1})$ | $H_2$ combination rate $P_{H_2}=500$ p.s.i. (moles/hr./liter) |
| 0.025 | 0.4 | 0.1 | 28 | 19 |
| 0.05 | [2] 7.8 | [2] 3 | [3] 44 | [3] 29 |
| 0.075 | 1.7 | 0.5 | 40 | 27 |
| 0.10 | 2.8 | 0.8 | 34 | 21 |
| 0.15 | 20 | 5 | 7.7 | 5 |
| 0.20 | 31 | 9 | 15 | 10 |

[1] Heated with hydrogen overpressure for 1.5 hrs. at 280° C.; 1,000 p.s.i. added at room temperature.
[2] Extrapolated from rate data obtained at 250° C. and below.
[3] Extrapolated from rate data obtained at 102° C. and below.

EXAMPLE IV

A thorium-uranium oxide slurry having a concentration of 750 grams Th/kg. $H_2O$, 0.5 mole percent enriched U and 0.15 molal $MoO_3$, was irradiated in a nuclear reactor at 300° C. for 192 hours at a power density of 4.3 kw./liter, this being within the range of power densities expected in large scale thermal breeder reactors. Less than 100 p.s.i. gas pressure in excess of steam pressure existed after the irradiation. This result was obtained for a slurry which had not been activated with hydrogen. This low increase in pressure under these conditions indicates that substantial recombination was effected.

EXAMPLE V

The recombination rates of hydrogen and oxygen in slurries containing thorium-uranium oxides calcined under various conditions were determined in a series of runs using the procedure of Example II. In each run the slurry contained 500 grams thorium in the form of thorium oxide per liter and 0.5 percent uranium as uranium trioxide. The molybdenum trioxide concentration in each run except the last was 0.05 molal. The details of these runs are listed in Table III.

*Table III*

EFFECT OF CALCINATION TEMPERATURE AND TIME ON HYDROGEN-OXYGEN COMBINATION IN THORIUM OXIDE SLURRIES

| Thorium-uranium oxide calcination conditions | | Moles $H_2$ per hour per liter slurry ($H_2$ partial pressure 500 p.s.i.) | | | |
|---|---|---|---|---|---|
| | | Slurry as prepared | | Activated slurry [1] | |
| Temp. (° C.) | Time (hours) | Moles | Reaction temp. (° C.) | Moles | Reaction temp. (° C.) |
| 800 | 24 | 0.1 | 280 | 3.1 | 280 |
| 1,000 | 4 | 0.1 | 295 | 0.1 | 295 |
| | 16 | 0.1 | 284 | 94.0 | 250 |
| | 24 | 58.7 | 250 | 41.0 | 250 |
| 1,200 | 4 | 45.2 | 200 | 53.3 | 200 |
| 1,600 | 24 | 12.8 | 280 | 12.8 | 280 |
| [2] 1,600 | 24 | 36.8 | 252 | 56.3 | 249 |

[1] Slurry heated under $H_2$ (250 p.s.i. measured at 25° C.) for 2 hours at 270° C.
[2] Molybdenum trioxide concentration 0.012 molal.

The above examples are merely illustrative and are not to be understood as limiting the scope of my invention, which is limited only as indicated in the appended claims. In addition my invention is applicable generally to pressurized thorium oxide and thorium-uranium oxide slurries and is not to be understood as limited to a specific nuclear reactor design.

Having thus described my invention, I claim:

1. A method of combining hydrogen and oxygen in an aqueous slurry containing a major proportion of thorium oxide and a minor proportion of uranium trioxide which comprises providing a small amount of molybdenum trioxide in said slurry under superatmospheric pressure.

2. The method of claim 1 wherein said molybdenum trioxide is provided at a concentration within the range of 0.01 molal to 0.2 molal.

3. A method of combining hydrogen and oxygen in an aqueous slurry containing a major proportion of thorium oxide and a minor proportion of uranium trioxide which comprises heating said slurry under a hydrogen atmosphere and providing a small amount of molybdenum trioxide in said slurry under superatmospheric pressure at a concentration within the range of 0.01 molal to 0.2 molal.

4. A method of combining hydrogen and oxygen resulting from the subjection of an aqueous slurry containing a major proportion of thorium oxide and a minor proportion of uranium trioxide to ionizing radiation in a nuclear reactor which comprises providing molybdenum trioxide in said slurry at a concentration within the range of 0.01 molal to 0.2 molal under superatmospheric pressure.

5. The method of claim 4 wherein the temperature of the resulting molybdenum trioxide-containing slurry is within the range of approximately 150° C. to 300° C.

6. The method of claim 4 wherein said thorium oxide is calcined at a temperature within the range of approximately 900° C. to 1600° C. before said thorium oxide is added to said slurry.

References Cited in the file of this patent

UNITED STATES PATENTS

| 2,743,225 | Ohlinger et al. | Apr. 24, 1956 |
| 2,863,729 | McDuffie et al. | Dec. 9, 1958 |

OTHER REFERENCES

Lange: "Handbook of Chemistry," 5th edition, 1944, pages 210–211.

Krohn: "Radiation Studies of Thorium Oxide Slurries," HRP Civilian Power Reactor Conference held at Oak Ridge National Laboratory, May 1–2, 1957 TID–7540, issued July 1957, pages 128–142.